Nov. 29, 1955   J. C. WAGNER   2,725,251
FENDER LOCK
Filed Dec. 17, 1952   2 Sheets-Sheet 1
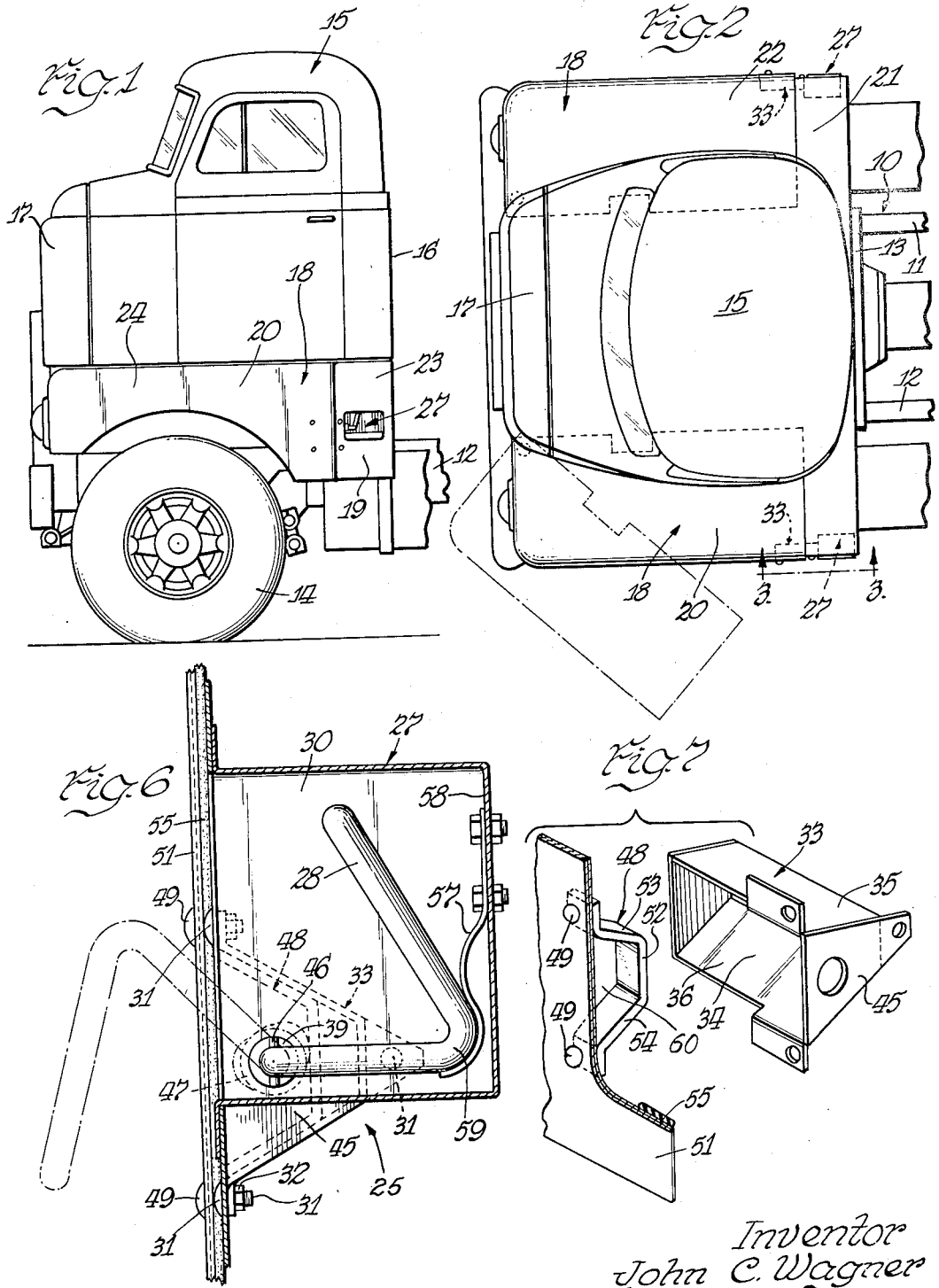
Inventor
John C. Wagner
Paul O. Pippel
Atty.

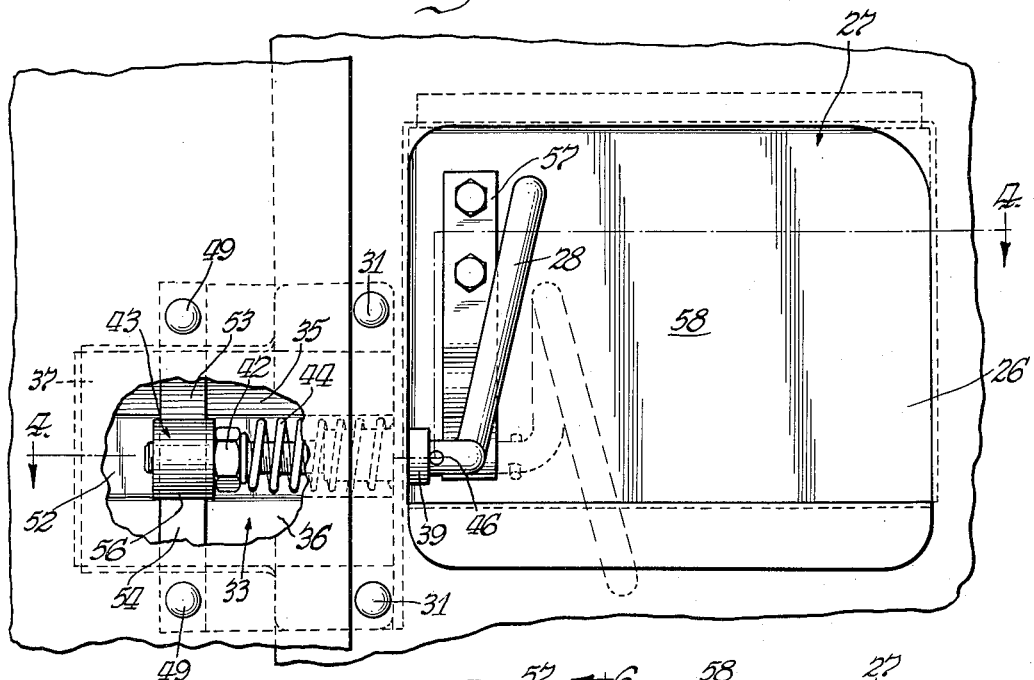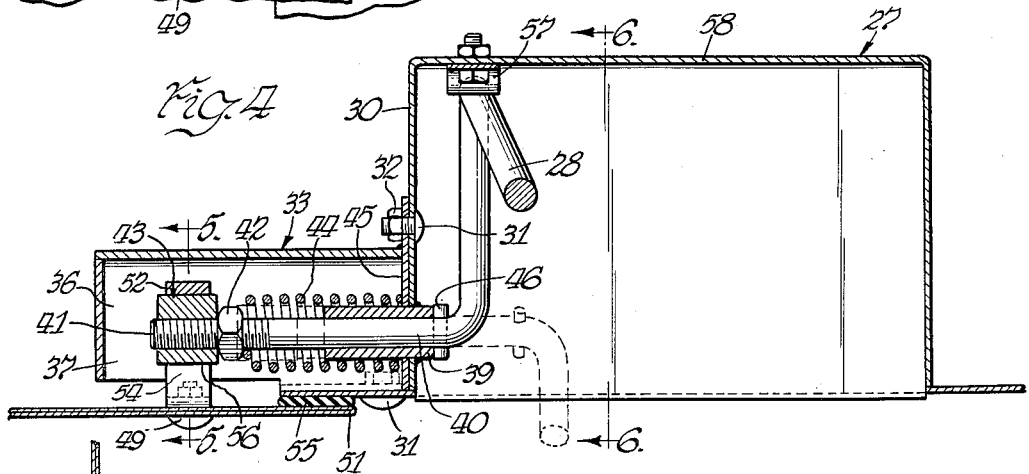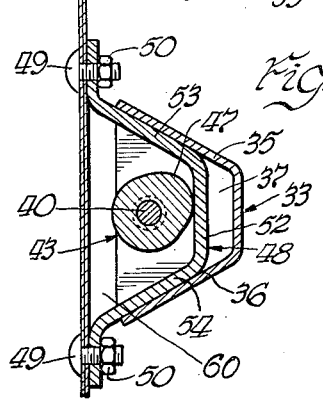

United States Patent Office 2,725,251
Patented Nov. 29, 1955

2,725,251

FENDER LOCK

John C. Wagner, Berkeley, Calif., assignor to International Harvester Company, a corporation of New Jersey Application December 17, 1952, Serial No. 326,447

9 Claims. (Cl. 292—241)

This invention relates to a sectional fender construction for an automotive vehicle such as a motor truck and more particularly to a new and improved quick releasable lock device for connecting the fender sections together.

The primary objective of the present invention is the provision of a novel quick releasable lock device for connecting a movable fender section to a stationary section of a sectional fender. The lock device may be applied to a sectional fender of the type illustrated in copending application Serial No. 313,831, entitled "Pivotally Mounted Vehicle Fender," filed October 9, 1952, and assigned to the assignee of the present invention. In that application a vehicle fender is shown which is disposed below the vehicle body of a cab-over-engine type motor truck and which extends substantially the full length of the engine mounted beneath the body to serve as one wall of an enclosure for the engine. The fender includes a stationary section which is secured to the vehicle body or the chassis frame and a movable section which is normally disposed in alignment with the stationary section but is capable of being swung away from the stationary section or be entirely removed to gain access to the side of the engine enclosed thereby.

Another object is the provision of a new and improved releasable lock device for securing the fender sections of a sectional fender in snug, close-fitting engagement with each other.

A further object is the provision of a lock device which includes a cam slidably and rotatably carried by one fender part which is engageable with the mating fender part of a sectional fender to releasably connect the fender sections together in such a manner as to mitigate the possibility of the sections rattling or squeaking during the operation of the vehicle.

A still further object is the provision of a socket supported by one fender section and a projecting member carried by the other fender section which is forced into and maintained in the socket by means of a camming mechanism rotatably supported by one of the fender sections.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of a motor truck embodying the invention;

Figure 2 is a plan view of the motor truck shown in Figure 1; the dotted lines represent the open or swung position of a movable fender section;

Figure 3 is an enlarged, fragmentary view of the releasable lock device for connecting the movable fender section to the stationary fender section;

Figure 4 is a plan sectional view taken substantially along line 4—4 of Figure 3;

Figure 5 is an end sectional view of the lock device taken substantially along line 5—5 of Figure 4;

Figure 6 is an end sectional view taken substantially along line 6—6 of Figure 4; and Figure 7 is an exploded, perspective view of the keeper and the socket for receiving the keeper.

Referring to the drawings in detail, wherein like reference characters designate like elements throughout the various views, there is shown a motor truck chassis frame 10 which includes a pair of transversely spaced, longitudinally extending side sill members 11 and 12 interconnected by a plurality of cross members 13 (one of which is shown in Figure 2). Steerable, ground engaging wheels 14 are resiliently suspended from the chassis frame 10 in a conventional manner.

The vehicle power plant (not shown) is mounted on the extreme forward end of the chassis frame 10. Supported over the power plant is an operator's compartment, designated generally by numeral 15. The longitudinal limits of the operator's compartment 15 are defined by a rear panel 16 and a front panel 17.

A vehicle fender 18 is disposed below the lower marginal edge of the operator's compartment 15 along each side thereof. Each fender 18 extends substantially from the vicinity of the rear panel 16 to the front panel 17 and includes a relatively short stationary section 19 rigidly connected to the operator's compartment 15 or directly to the chassis frame 10 and a movable section 20 connected to the chassis frame for pivotal movement about a vertical axis. The stationary and movable sections 19, 20 are formed with horizontally disposed walls 21, 22, respectively, which extend transversely from the operator's compartment 15 and are in longitudinal alignment when the movable section 20 is in its normal, inswung position, as shown in Figures 1 and 2, to cover a respective wheel 14. Depending from the horizontally disposed walls 21, 22 of each fender 18 are vertically disposed walls 23, 24, respectively, which are also longitudinally aligned when the movable fender section 20 is in its closed or in-swung position. It will be appreciated that the above brief discription of vehicle structure, described in detail in patent application, Serial No. 313,831, is not intended to limit the scope of the invention but rather to establish one of many possible environments therefor. Obviously, any conventional vehicle structure could be substituted for the foregoing structure without departing from the spirit and scope of the invention.

A novel quick releasable lock device, designated generally by numeral 25 and shown in detail in Figures 3, 4, 5, 6, and 7, is provided for connecting the movable fender section 20 of each fender 18 to its respective stationary section 19. As best illustrated in Figure 3, the vertical wall 23 of each stationary section 19 is provided with a rectangular opening 26. The flanged edges of an outwardly facing, cup-shaped member 27 are rigidly secured to the vertical wall 23 adjacent the opening 26. The cup-shaped member 27 serves as a step to facilitate entrance and exit to and from the operator's compartment 15 by the operator and as an enclosure for a substantially V-shaped latch bolt actuating handle 28, the purpose of which will be described hereinafter.

Fastened to the forward end wall 30 of the member 27 and the vertical wall 23 by means of bolts 31 and nuts 32 is a longitudinally extending socket element 33. As illustrated in Figure 7 the socket element 33 has a rectangular opening 34 formed therein and the top and bottom walls 35, 36 thereof converge toward each other as they extend inwardly from the vertical plane containing the opening 34. By virtue of the above socket element construction it will be appreciated that an outwardly facing, wedge-shaped pocket or recess 37 is formed forwardly of the marginal edge 38 of the vertical wall 23.

A bearing sleeve 39 is welded to the end wall 30 and extends longitudinally into the pocket 37. It will be noted that the bearing sleeve 39 is vertically spaced substantially midway between the top and bottom walls 35, 36. Integrally formed with the actuating handle 28 is a latch bolt 40 which is rotatably and slidably journaled in the bearing sleeve 39. A portion 41 of the latch bolt 40 disposed within the pocket 37 has screw threads formed thereon which are engageable by a jam nut 42 and a cam head 43. The cam head 43 is capable of being adjusted longitudinally along the latch bolt 40 and locked in its adjusted position by screwing the jam nut 42 tightly against the cam head 43. From the foregoing, it will be appreciated that the cam head 43 can be rotated and moved longitudinally within the pocket 37 by actuation of the handle 28. A helical spring 44 encircles the latch bolt 40 and bearing sleeve 39 and abuts the jam nut 42 and one end wall 45 of the socket element 33 to yieldably urge the latch bolt 40 to the left, as viewed in Figures 3 and 4. A pin 46 extending transversely through the latch bolt 40 limits the longitudinal movement of the latch bolt to the left by contacting the end of the bearing sleeve 39. The cam head 43 is provided with an eccentric portion 47, the purpose of which will be explained presently.

A wedge-shaped keeper 48 is secured to the vertical wall 24 by means of bolts 49 and nuts 50. As shown in Figures 4 and 5, the keeper 48 is longitudinally spaced from the rear marginal edge 51 of the vertical wall 24 and includes a vertically disposed section 52 interconnecting a pair of diverging legs 53, 54. It will be apparent that the section 52, legs 53, 54, and the vertical wall 24 define an aperture 60. The keeper 48 is horizontally aligned with the socket element 33 and is received in the pocket 37 when the movable fender section 20 is swung to its closed position. The legs 53, 54 frictionally engage the top and bottom walls 35 and 36, respectively, of the socket element 33 when the keeper 48 is inserted into the pocket 37 and the aperture 60 is in longitudinal alignment with the latch bolt 40.

In operation, assuming that the movable fender section 20 is in the disconnected or open position shown in dotted lines in Figure 2 and it is desired to connect the fender sections 19, 20 together, the latch bolt 40 is first moved longitudinally to the right to the dotted position shown in Figure 4 against the resilient action of the spring 44 and rotated to the dotted position shown in Figure 6. Thereafter, the movable fender section 20 is pivoted to its closed position and the keeper 48 is caused to enter the pocket 37. In this position the marginal edge of the stationary section 19, which has a strip 55 of weather stripping material secured thereto by any suitable means, is overlapped by the rearwardmost edge of the movable section 20. The latch bolt 40 is then released and the cam head 43 moves axially to a position where it is in transverse alignment with and spaced outwardly of the section 52 of the keeper 48. It is to be understood that the cam head 43 was previously adjusted axially with respect to the latch bolt 40 whereby the cam surface 56, which has a width substantially the same as the width of the section 52, is in transverse alignment with the section when the pin 46 contacts the end of the bearing sleeve 39. It will also be noted that the cam head 43 has also been positioned and fixed with respect to the latch bolt 40 whereby the eccentric portion 47 extends outwardly away from the section 52 to permit the latch bolt to assume the position shown in Figure 4. Thereafter, clockwise rotation of the actuating handle 28 causes the eccentric portion 47 to engage the section 52 of the keeper 48 and force the keeper into a tight abutting relationship with the socket element 33. It will be appreciated that the fender sections 19 and 20 are prevented from moving vertically and horizontally with respect to each other when locked together by the above described structure and the possibility of the sections rattling or squeaking during the use of the motor truck is greatly mitigated. In order to prevent the eccentric portion 47 from being inadvertently rotated out of engagement with the section 52, a spring catch member 57, secured to the inner wall 58 of the cup-shaped member 27, frictionally engages the bight section 59 of the actuating handle 28 to yieldably lock the latch bolt 40 and prevent rotation of the same. In order to disconnect the movable section 20 from the stationary section 19 of the above enumerated steps are merely reversed.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A releasable lock device for connecting the engageable edges of the sections of a sectional vehicle fender of the type comprising a stationary section and a pivotally supported movable section, comprising a socket element rigidly attached to the stationary section adjacent the juncture of the engageable edges of the fender sections and extending longitudinally beyond the juncture, the walls of said socket element being formed to provide an outwardly facing pocket, the top and bottom limits of said pocket being defined by inwardly converging walls of said socket element; a keeper fastened to the movable section insertable in said pocket, said keeper having a pair of outwardly diverging legs interconnected by a vertical section to partially define an aperture, said legs being engageable with said top and bottom walls of said socket elements; a bearing sleeve attached to the stationary fender section; a latch bolt rotatably and longitudinally slidably supported by said bearing sleeve, said latch bolt being slidable through the aperture partially defined by said keeper when said keeper is inserted in said pocket; and cam means carried by said latch bolt and engageable with said vertical section upon rotation of said latch bolt to force said legs of said keeper tightly against said top and bottom walls of said socket element when said latch bolt is within said keeper aperture.

2. The releasable lock device substantially as set forth in claim 1, in which spring means are provided for continually urging said latch bolt longitudinally toward said keeper aperture.

3. A releasable lock device for connecting the engageable edges of the sections of a sectional vehicle fender of the type comprising a stationary section and a pivotally supported movable section, comprising a socket element rigidly attached to the stationary section adjacent the juncture of the engageable edges of the fender sections and extending longitudinally beyond the juncture, said socket element being provided with an outwardly facing pocket; a keeper fastened to the movable section insertable in said pocket, said keeper partially forming a longitudinally extending aperture, the longitudinal axis of said aperture being disposed substantially perpendicular to a vertical plane containing the pivotal axis of said movable section; a latch bolt rotatably and longitudinally slidably supported by said stationary section, said latch bolt being slidable through the aperture partially formed by said keeper when said keeper is inserted in said pocket; and cam means carried by said latch bolt and engageable with said keeper upon rotation of said latch bolt to force said keeper tightly against said socket element.

4. A releasable lock device for connecting the sections of a sectional vehicle fender of the type comprising a stationary section and a pivotally supported movable section, comprising a socket element rigidly attached to one fender section, said socket element being provided with an outwardly facing wedge-shaped pocket; a wedge-shaped keeper projecting inwardly from the other fender section insertable in said pocket, said keeper being provided with a central aperture having a longitudinal axis extending substantially perpendicular to a vertical plane containing the pivotal axis of said movable section; a latch bolt carried by said first mentioned fender section, said latch bolt being slidable longitudinally to an extended position wherein said latch bolt extends through the keeper aperture when said keeper is inserted in said pocket; and cam means carried by said latch bolt and engageable with said keeper upon rotation of said latch bolt to force said keeper tightly into wedging engagement with said socket element.

5. A releasable lock device substantially as set forth in claim 4, in which yieldable means are provided for continually urging said latch bolt to its extended position.

6. A releasable lock device for connecting the free end of a pivotally mounted member to a stationary member, comprising a bearing surface attached to one member; a keeper having a bearing surface attached to the other member, said keeper having a central aperture having a longitudinal axis disposed substantially perpendicular to a vertical plane containing the pivotal axis of said movable member and the bearing surface thereof being adapted to abut said bearing surface attached to the other member; an enlarged cam head supported by said first mentioned member, said cam head being slidable through the keeper aperture when said bearing surfaces are adjacent each other, said cam head being rotatable to engage said keeper and force said bearing surfaces tightly together.

7. The combination as set forth in claim 6, in which said bearing surfaces lie in a plane disposed at an angle with respect to a vertical plane containing the rotational axis of said cam head.

8. A releasable lock device for connecting the sections of a sectional vehicle fender of the type comprising a stationary section and a pivotally supported movable section, comprising a socket element having a bearing surface attached to one fender section; a keeper having a bearing surface adapted to abut the bearing surface of said socket element, said keeper being attached to the other fender section and being provided with a central aperture having a longitudinal axis disposed substantially perpendicular to a vertical plane containing the pivotal axis of said movable section; a cam head supported by said first mentioned fender section, said cam head being slidable through the keeper aperture when said keeper bearing surface abuts said socket element bearing surface, said cam head being rotatable to engage said keeper and force said keeper bearing surface tightly against said socket element bearing surface.

9. A releasable lock device for connecting the sections of a sectional vehicle fender of the type comprising a stationary section and a pivotally supported movable section, comprising a socket element having a bearing surface attached to one fender section; a keeper having a bearing surface adapted to abut the bearing surface of said socket element, said keeper being attached to the other fender section and being provided with a central aperture and a vertical section, said abutting bearing surfaces of said socket element and keeper lying in a plane disposed at an angle with respect to a vertical plane containing said vertical section; a cam head supported by said first mentioned fender section, said cam head being slidable through the keeper aperture when said keeper bearing surface abuts said socket element bearing surface, said cam head being rotatable to engage said vertical section of said keeper and force said keeper bearing surface tightly against said socket element bearing surface.

References Cited in the file of this patent

UNITED STATES PATENTS

| 692,047 | Bronson | Jan. 28, 1902 |
| 1,325,440 | Haufmann | Dec. 16, 1919 |
| 1,709,915 | Morris | Apr. 23, 1929 |

FOREIGN PATENTS

| 31,258 | Denmark | Feb. 5, 1923 |